May 20, 1941.  T. G. STRICKLAND  2,242,627
HYDROGENATION CATALYST AND PROCESS
Filed Nov. 12, 1938
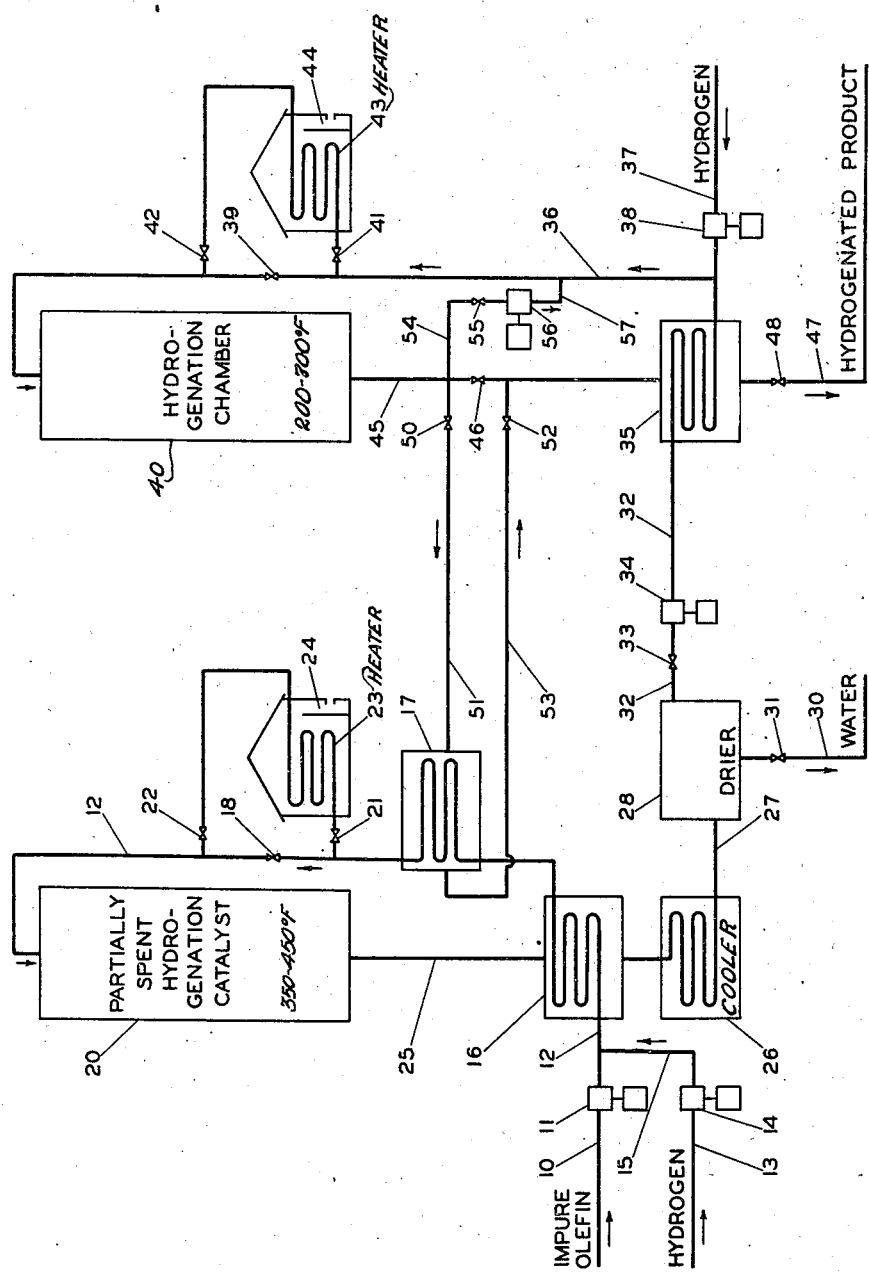
INVENTOR
THOMAS GABLE STRICKLAND
BY
ATTORNEYS Patented May 20, 1941

2,242,627

UNITED STATES PATENT OFFICE 2,242,627

HYDROGENATION CATALYST AND PROCESS

Thomas G. Strickland, Bartlesville, Okla., assignor to Phillips Petroleum Company, a corporation of Delaware Application November 12, 1938, Serial No. 240,196

13 Claims. (Cl. 260—676)

This invention relates to non-destructive hydrogenation of olefin hydrocarbons. It relates more particularly to an active and rugged catalyst suitable for the hydrogenation of various organic compounds, and further it relates to a hydrogenation process for which this catalyst is suitable.

It is an object of this invention to provide a nickel-containing catalyst suitable for the hydrogenation of organic compounds.

It is a further object of this invention to provide a catalyst that has a high activity in reactions wherein hydrogen is introduced into an organic compound.

Another object of my invention is to provide a catalyst which is highly efficient in a process for the non-destructive hydrogenation of normally liquid unsaturated hydrocarbons whereby saturated hydrocarbons of the same number of carbon atoms per molecule and same general carbon skeleton are formed.

Still another object of my invention is to provide a process whereby organic compounds are purified in the presence of hydrogen and in the presence of a catalyst.

Yet another object of my invention is to provide a process whereby unsaturated hydrocarbons are purified in the presence of hydrogen and in the presence of a catalyst in one stage of a process and in another stage of the process are reacted with hydrogen in the presence of a catalyst.

A further object of this invention is to free large quantities of olefin hydrocarbons of their impurities and subsequently in a separate step to hydrogenate the olefins so purified.

It is another object of my invention to produce paraffinic motor fuel from low molecular weight polymers of normally gaseous olefin hydrocarbons.

It has long been known that pure olefin hydrocarbons may be readily hydrogenated to paraffin hydrocarbons in the vapor phase and in the presence of a catalyst such as finely divided metallic nickel. It has also long been known that unsaturated fatty acids and fats may have their olefinic linkages saturated with hydogen by reaction in the liquid phase and in the presence of finely divided catalysts such as finely divided metallic nickel and the like. These latter materials have such high boiling points that it is impossible to treat them in the vapor phase without the occurrence of extensive deleterious side reactions such as those of decomposition, and it is possible to treat them at a suitable hydrogenation temperature without the application of more than very moderate pressures by treating them in the liquid phase.

Modern internal combustion, spark ignition engines require fuels which do not appreciably detonate, that is, they operate best on fuels which have high octane numbers. The detonation characteristics of hydrocarbons used as fuels vary quite widely with their molecular species; that is, whether they are paraffinic, olefinic, naphthenic, or aromatic; with their molecular structure, that is, whether the molecules of the hydrocarbons are relatively simple or highly branched in structure; their molecular weight; and with their concentrations in admixture with other hydrocarbons. Many fuels are more or less complex mixtures of hydrocarbons, and this last variable is often of considerable importance. In addition to these factors relating directly to detonation, other characteristics which must be considered are the stability of the hydrocarbon in the fuel to gum and color formation after prolonged storage in contact with air and/or water, and the susceptibility to additions of tetra-ethyl-lead and other antidetonating agents, that is, the amount of increase in the octane number of a motor fuel upon the addition of a given quantity of an agent such as the familiar tetra-ethyl-lead.

It has been found that paraffin hydrocarbons which are normally liquid, which boil below about 400° F. and which have one or more branches in their molecular structure are ideal for fuels for high compression engines. Such hydrocarbons are extremely stable during long storage, they have high octane numbers in the pure state and the effect of these high octane numbers is not appreciably lost on blending, and it is possible to increase the octane number of a fuel consisting of such hydrocarbons considerably by adding only small amounts of an agent such as tetra-ethyl-lead.

Olefin hydrocarbons corresponding to such desirable paraffin hydrocarbons are now readily prepared by the catalytic polymerization of lower molecular weight olefins. Thus, diisobutylene, corresponding to the well known isooctane, 2,2,4-trimethylpentane, is readily prepared by polymerizing isobutylene. Other branched octenes may be prepared by the polymerization of normal butenes and by the copolymerization of isobutylene and normal butenes. Similarly, other olefins, of both higher and lower molecular weights, may be prepared by the polymerization of olefins and mixtures of olefins having low molecular weights. The olefin hydrocarbon products produced by the simple catalytic polymerization of such low molecular weight olefins vary not only with the original olefins and mixtures of olefins but also with the operating conditions during polymerization and the catalysts used. Thus, commercial products will vary from essentially pure diisobutylene, mixed with a little triisobutylene, to complex hydrocarbon mixtures containing olefins having from about six to about twelve or more carbon atoms per molecule. Most generally it is such more or less complex mixtures which are produced by commercial polymerization processes.

In order to produce, from low molecular weight olefins, motor fuels which are paraffinic, have high octane numbers and are greatly improved by the addition of small amounts of tetra-ethyl-lead, it has been found desirable to polymerize such olefins and subsequently to hydrogenate the olefin polymers. When this is carried out on a laboratory scale the procedure is relatively simple, the materials being worked with are comparatively pure, or are easily purified, and simple procedures and catalysts which are old in the art are quite successful for the non-destructive hydrogenation of the olefin polymers. However, a catalyst suitable for prolonged and economical hydrogenation in a commercial process is not so readily available, especially when commercial polymerization products contain small amounts of impurities which are ordinarily costly to remove. Often these impurities are peroxides or other oxygen-containing compounds, found in polymers after they have been inadvertently contacted with air and water. Sometimes such compounds are formed in connection with the steam distillation of olefins. In such cases, it is often not feasible to remove such compounds by means usually used in the laboratory.

I have now found that a catalyst suitable for the hydrogenation of commercial mixtures of olefin polymers in the gasoline boiling range may be prepared by forming an intimately associated mixture of nickel oxide, copper oxide and aluminum oxide upon an inert support and treating this material with hydrogen. Such a catalyst will be hereinafter referred to as nickel-copper-alumina catalyst. I have found that an advantageous method of preparing such a catalyst is to prepare an aqueous solution containing nickel nitrate, copper nitrate, and aluminum nitrate, mixing with this solution a granulated inert support such as granular pumice stone and evaporating the water from this mixture. Such an evaporation may be accomplished by heating this mixture to its boiling point and constantly stirring it as it boils and the water evaporates. As the water evaporates the solution becomes more and more concentrated with respect to the salts contained therein, and finally the various nitrates are deposited out upon the inert support which is present. As the evaporation continues, this deposition progresses until all of the nitrates are deposited upon the surface of the support, and the coated or impregnated support finally becomes dried, and the nitrates are then decomposed in a stream of air, the temperature gradually being raised until a final temperature of about 650 to 750° F., or more has been attained. During this decomposition the nitrates which were deposited upon the inert support are decomposed and the intimate mixture of the oxides of the various metals remain upon the catalyst. The decomposition of these nitrates is accompanied by the formation of nitrogen oxides which are very corrosive and obnoxious and this operation is preferably carried out with the coated particles of the support upon trays which are provided with adequate means of ventilation so that these nitrogen oxides are carried away without injury to surrounding equipment or people.

A modified method of preparing such a catalyst is to soak a body of support such as pumice, composed of particles passing a standard 4 mesh sieve and retained by a 10 mesh sieve, in a concentrated aqueous solution of the nitrates for a half-hour or more, at ordinary temperatures, such as about 50 to 100° F. After such soaking, the impregnated support is removed from the solution, is dried and heated to an elevated temperature of 400° F. or more, whereby the nitrates are decomposed forming the corresponding oxides. The resultant material is then again treated by soaking it in an aqueous solution, concentrated with respect to the same salts, removing the treated material and again drying it and decomposing the nitrates. This process is repeated until a desired amount of the metals in the form of metal oxides is associated on and with the support. In the case of ordinary pumice, two or three such treatments generally suffice to make a very active and durable catalyst, containing sufficient nickel to correspond to between about 1.5 and 5 pounds of nickel nitrate $(Ni(NO_3)_2.6H_2O)$ per gallon of support, preferably about 3 pounds of nickel nitrate per gallon of support.

After the nitrates have been substantially completely decomposed and only an intimate mixture of metallic oxides remain deposited on the particles of the supoprt, the mixture is then treated with hydrogen at a more or less elevated temperature. This treatment is preferably carried out with the particles of material to be treated placed within the hydrogenation chamber in which the catalyst is subsequently to be used. The treatment is accomplished by passing hydrogen or a mixture containing hydrogen over the catalyst. I have at times found it advantageous to treat the mixture of metal oxides with hydrogen only at a low temperature, such as is obtained by heating the mixture of oxides from atmospheric temperature to an initial reaction temperataure of about 200° F. in a stream of hydrogen and in the reaction chamber, and then passing the reaction mixture through the chamber. The final catalytic material should not be exposed to oxygen-containing gases at elevated temperatures, as these gases will react rather violently with the reduced material.

The catalyst so prepared consists of an intimate mixture which contains metallic nickel and metallic copper and aluminum oxide, although since it has been prepared by reducing a mixture of the metallic oxides, it may also at times contain various amounts of nickel oxide or of copper oxide or both. In any event I have found that a catalyst prepared in this manner is highly active in promoting the non-destructive hydrogenation of olefin hydrocarbons in the motor fuel boiling range. It is also active in promoting the addition of hydrogen to all hydrocarbons in this boiling range which have unsaturated linkages between two adjacent carbon atoms, such as unsaturated naphthenes and aromatics such as benzene. Such hydrogenation treatment may be carried out with the hydrocarbons to be treated either in the vapor or liquid phase or under mixed phase conditions. In any case, it is preferable that the hydrogenation process be carried out at super-atmospheric pressure of the order of 200 to 2000 pounds per square inch, preferably of the order of 750 to 1000 pounds per square inch and at temperatures between about 200° F. and about 700° F., although at the higher temperatures some decomposition reaction of the hydrocarbons may begin to take place. With some charge stocks and with very active catalysts, only a small superatmospheric pressure may be necessary. The most desirable conditions of temperature and pressure for any particular case may be readily determined by trial by one skilled in the art.

I have found that in many hydrocarbon mixtures containing olefins which are to be non-destructively hydrogenated there are present deleterious amounts of impurities which are harmful to a hydrogenation catalyst such as the one just described. If the original mixture from which the olefin polymers were formed contained some sulfur compounds, these impurities may consist of small amounts of sulfur-containing compounds. However, it is much easier to purify these normally gaseous hydrocarbons from such sulfur compounds than it is to purify the heavier hydrocarbon material, so that in many cases the olefin polymers will be prepared from relatively pure hydrocarbons and will contain little if any deleterious sulfur compounds. However, no matter what the source of the olefin polymers they will have been contacted with air, probably in the presence of water, and a certain small amount of oxygen-containing compounds such as organic peroxides will have been formed. If these oxygen-containing compounds are allowed to remain in the hydrocarbon mixture containing olefin polymers to be hydrogenated, I have found that they will react preferentially in the presence of the hydrogenating catalyst forming water, and such reaction will tend to poison the catalyst and shorten its useful life.

I have now found that these oxygenated compounds may be quite readily reacted with hydrogen in the presence of a catalyst and in fact they will react with hydrogen forming water in the presence of a nickel-containing catalyst which has become deactivated for the non-destructive hydrogenation of olefin hydrocarbon. Thus I have found that, when a hydrocarbon mixture containing olefins which have been purified, is passed along with hydrogen over a nickel-containing catalyst, such as the nickel-copper-alumina catalyst described herein, the catalyst gradually becomes deactivated, that is, it promotes the hydrogenation reaction less and less readily, and it is necessary gradually to increase the temperature of operation in order to maintain the content of unreacted olefin in the effluent from the hydrogenation chamber at zero or at a small negligible value. As this temperature of hydrogenation is increased to above about 650 to 675° F. decomposition reactions set in and the hydrogenation step must be discontinued or, if continued, a new batch of catalyst must be used. After such use the catalyst is called a "deactivated" catalyst. However, I have found that a catalyst which has become deactivated for this reaction still retains sufficient activity so that it may be used as a catalyst for purifying fresh olefin charge, in the presence of hydrogen, from oxygen-containing compounds which may be present. Also, I have found that such treatment may be successfully carried out at a temperature appreciably below the final temperature at which the catalyst was previously used. Thus, the impure charge stock may be passed over such a spent catalyst in the presence of small amounts of hydrogen at a temperature which is not sufficiently elevated to induce decomposition reactions of the hydrocarbon or to promote appreciable hydrogenation and these oxygen-containing compounds will react with the hydrogen present, whereby water is formed and very little if any of the olefin hydrocarbons are hydrogenated. The effluent from this purification step may be then freed of water by cooling it to approximately atmospheric temperature and separating the water which condenses and separates out from the hydrocarbon mixture and/or by treating this stream with a drying agent such as calcium chloride, absorbent alumina and the like. I have further found that in the successful hydrogenation of olefin hydrocarbons it is desirable that the olefin hydrocarbons should not be present in the reacting mixture in too large amounts, and that in order to maintain the olefin content of the mixture charged to the hydrogenation step at a sufficiently low value, it is desirable to recirculate a portion of the saturated effluent from the hydrogenation chamber. This may be accomplished by directly recycling a portion of the effluent from the hydrogenation chamber back to the inlet of this hydrogenation chamber. However, in the purification of a charge stock containing deleterious oxygen containing compounds, it is not necessary that this material be mixed with recycle stock, although at times such may be desirable for other reasons. Thus, I have found that I may pass such an impure charge stock in admixture with a limited amount of hydrogen over a spent catalyst at a temperature which is appreciably lower than that at which said spent catalyst was last used to effect substantially complete hydrogenation of olefin hydrocarbons to paraffin hydrocarbons, such as a temperature of about 100–200° F. lower than a previous temperature of hydrogenation, whereby the oxygen-containing impurities are reacted with hydrogen and water is formed. The water is then removed from the effluent of this first chamber, the dried effluent stream is then mixed with a portion of the hydrogenated effluent of a second catalyst chamber and this final mixture is then passed, in the presence of additional hydrogen, over a comparatively fresh nickel-containing catalyst at a temperature between about 200 and 650° F. whereby the olefin hydrocarbons are nondestructively hydrogenated and the nickel-containing catalyst used has an extensive period of life.

One method whereby olefin hydrocarbons in the motor fuel boiling range may be purified from contaminants such as oxygen-containing compounds and may subsequently be non-destructively hydrogenated will now be described in connection with the accompanying drawing which shows diagrammatically one arrangement of apparatus suitable for conducting my process.

Referring now to the drawing, an olefin-containing hydrocarbon mixture is passed to the process through conduit 10 and is compressed to a suitable pressure by pump 11. Such a charge stock may consist essentially completely of olefin hydrocarbons in the gasoline boiling range which have been produced by polymerization of olefin hydrocarbons having lower molecular weight, or if such a polymerization process has been conducted in the presence of paraffin hydrocarbons of substantially the same boiling point as the polymers, these olefin hydrocarbons may be accompanied by such paraffin hydrocarbons. From pump 11 the olefins continue on through conduit 12, sufficient quantities of hydrogen are introduced through conduit 13 and are compressed to a desirable pressure by pump 14 and admixed with the hydrocarbons in conduit 12, passing from pump 14 to conduit 12 through conduit 15. The mixture of hydrocarbons and hydrogen passes through heat exchangers 16 and 17 and through valve 18 and is introduced at the top of the catalyst chamber 20. As may be desired the mixture may be further heated by opening valves 21 and 22 and closing valve 18 and allowing the mixture to pass through coil 23 in a heater such as the furnace 24, or valve 18 may be only partially closed and only a portion of the mixture passed through the heating coil if desired. Catalyst chamber 20 contains a deactivated nickel-containing catalyst which may be one spent by use in the hydrogenation of olefins and preferably a deactivated nickel-copper-alumina catalyst, and a reaction between hydrogen and the oxygen-containing compounds takes place therein whereby the oxygen-containing compounds disappear and water is formed. The effluent from catalyst chamber 20 passes through conduit 25, heat exchanger 16, cooling coil 26 and through conduit 27 to drying means 28. Drying means 28 represents any convenient apparatus for removing water from the effluent of the catalyst chamber 20. The effluent may simply be dried by cooling this material and separating out the water which condenses and which would collect in the bottom of a separator, and removing the water through conduit 30 controlled by valve 31. However, it will generally be more desirable to supplement or replace this simple means by a dehydrating agent such as calcium chloride and the like.

The mixture containing purified olefin hydrocarbons passes from the drier 28 through conduit 32 controlled by valve 33 and is compressed or boosted to a suitable pressure by pump 34. The effluent from the pump 34 passes through heat exchanger 35 into conduit 36 and is there admixed with recycled stock which passes through conduit 57, which will be hereinafter described. Additional hydrogen can be added as necessary to the mixture in conduit 36 through conduit 37 and is compressed to a suitable pressure by pump 38. This hydrogen should be added in amounts such that the total amount of hydrogen present in the subsequent portions of conduit 36 is appreciably more than the amount of hydrogen required to react with the olefins present and preferably should be at least about twice the molar equivalent of the olefin hydrocarbons present. The mixture of hydrocarbons and hydrogen is passed through valve 39 and enters hydrogenation chamber 40. If desired, valves 41 and 42 may be opened and valve 39 partially or completely closed and all or a part of the stream may be passed through the heating coils 43 which are positioned in a heater such as the furnace 44 whereby the temperature of the material entering hydrogenation chamber 40 is sufficiently elevated to initiate reaction under the pressure which exists at the inlet of this hydrogenation chamber, and in the presence of the catalyst contained therein.

Hydrogenation chamber 40 may be any one of a number of different types of hydrogenation chambers. Thus, it may be a long, vertical cylindrical catalyst chamber such as is diagrammatically shown, with a single large bed of catalyst resting upon a screen or similar support near the bottom of the chamber, or a series of such supports may be placed throughout the chamber and small individual beds of catalyst may rest on these supports. Although the hydrogenation reaction is highly exothermic, the process arrangement shown which includes an appreciable proportion of recycled hydrogenated material permits the hydrogenation reaction to be carried out in a chamber such as is illustrated without an undue temperature rise as the material passes through the chamber. However, it may at times be found more desirable to use a hydrogenation chamber of the type in which the catalyst is placed in a number of catalyst tubes which are surrounded by a bath which tends to control the temperature. Such chambers are well known in the art and may be readily adapted to my process, as may any other known type of chamber.

When using a fresh, highly active catalyst such as the nickel-copper-alumina catalyst herein described, the initial inlet temperature need not be greater than about 200 to 300° F. Under these conditions of operation the material passing through the catalyst chamber will undergo a temperature rise of about 50 to 150° F. above the temperature at the inlet of this chamber. The amount of this temperature rise will depend upon the olefin concentration in the mixture being passed through the catalyst chamber and upon the heat losses from the catalyst chamber by radiation and the like. By controlling these factors properly the amount of temperature rise may be suitably controlled as desired. As the process continues I have found that the activity of the catalyst tends to decrease slowly, even when using purified hydrocarbons, and as this takes place it is necessary to alter one or more of the variables so that the effluent hydrocarbons from this chamber will be substantially completely hydrogenated. As it is generally desirable to maintain a substantially constant flow of hydrogenated material from the process, I prefer to counteract this decrease in the activity of the catalyst by gradually increasing the temperature and/or the pressure of the inlet material. This raising of the temperature and/or pressure is continued as is necessary until the temperature of the effluent material has reached a value between about 650 and 750° F. and preferably the use of any particular batch of catalyst is stopped when the effluent temperature has attained a value of about 675° F. At this point the process can be continued using a fresh catalyst as will be readily understood by those skilled in the art. The chamber containing deactivated catalyst which has been removed from the hydrogenation of olefin hydrocarbons in this manner may be connected, by means of conduit not now shown, to substitute in the purification of the raw olefin charge in place of the catalyst chamber 20.

The effluent from the catalyst chamber 40 passes through conduit 45 and valve 46 and may be passed in indirect heat exchange relationship in heat exchanger 35 with fresh olefin hydrocarbons being charged to the process, and is finally discharged from the process through conduit 47 controlled by valve 48. If desired valve 50 in conduit 51 and valve 52 in conduit 53 may be opened and valve 46 completely or partially closed so that the material will also pass through heat exchanger 17 in indirect heat exchange relationship with the fresh impure olefinic material being charged to catalyst chamber 20. In the most preferable manner of operating the process a substantial proportion of the effluent of catalyst chamber 40 is passed through conduit 54 and valve 55 and is suitably boosted in pressure by pump 56 and passed by conduit 57 into the conduit 36 whereby it is mixed with fresh olefin charge to the hydrogenation chamber 40 as recycled stock adapted to dilute the olefin charge. The amount of paraffin hydrocarbons recycled in this manner is generally at least equal to the amount of olefin hydrocarbons in conduit 36 and most preferably is 2 to 10 times that amount. Since a substantial excess of hydrogen is preferably used, this recycle stream may also contain some of the excess hydrogen. It may sometimes be found more desirable to pass the entire effluent of the hydrogenation chamber 40 from the process through conduit 47 controlled by valve 48, remove the hydrogen therefrom and pass only a portion of the hydrocarbon effluent back to the process. If this procedure is followed this saturated hydrocarbon material to be recycled may again be introduced to the process along with the hydrogen through conduit 37 shown.

EXAMPLE 1

As an example for the preparation of an active nickel-containing catalyst which will be termed a nickel-copper-alumina catalyst, an aqueous solution was prepared which contained three pounds of nickel nitrate (Ni(NO$_3$)$_2$.6H$_2$O), 0.35 pound of copper nitrate (Cu(NO$_3$)$_2$.3H$_2$O) and 4.5 pounds of aluminum nitrate (Al(NO$_3$)$_3$.9H$_2$O) for every gallon of pumice subsequently added. This solution contained only enough water to maintain the salt in solution at about room temperature. Crushed pumice stone, which had been graded so that it was between 6 and 8 mesh to the inch in size, was added to this aqueous solution and the mixture was heated until the water was boiling, the mixture being thoroughly stirred. This heating and stirring was continued until all of the water had evaporated leaving behind pumice stone on which there was deposited in intimate mixture the various nitrates just enumerated. This mixture was then heated to a temperature between 660 and 750° F. while passing air over it, whereby the nitrates were decomposed and a residue of intimately associated metallic oxides was left upon the pumice granules. These oxides were then reduced by passing hydrogen over the material at about atmospheric pressure and at a temperature of about 680 F. The catalyst so prepared was then used to hydrogenate olefin hydrocarbons which are normally liquid and boil below about 400° F., in admixture with 3 volumes of paraffinic hydrocarbons of approximately the same boiling point. The catalyst prepared in this manner contained 0.616 pound of nickel per gallon of catalyst and hydrogenated approximateely 285 gallons of olefins per gallon of the catalyst before the catalyst was deactivated.

In order to determine the effect of changing the various amounts of the various salts used, a series of catalysts was prepared in which these values were altered, the methods of preparation being otherwise similar to those of the catalyst just described. The effectiveness of these other catalytic materials in the hydrogenation of olefin hydrocarbons in the gasoline boiling range is shown in the accompanying table.

*Dependence of catalyst life on nickel, aluminum and copper contents (catalyst, 6-8 mesh)*

| Per cent by weight | | | Gallon polymer hydrogenated per gallon catalyst | Percentage of olefin in total product |
| --- | --- | --- | --- | --- |
| Ni | Al | Cu | | |
| 87.3 | 0.0 | 12.7 | 16 | *8.8 |
| 79.2 | 20.8 | 0.0 | 107 | 1.6 |
| 71.1 | 18.6 | 10.3 | 150 | 1.5 |
| 58.9 | 15.4 | 25.7 | 189 | 1.5 |
| 39.6 | 10.4 | 50.0 | 192 | *1.5 |

*No completely saturated product was made.

EXAMPLE 2

As an example of the operation of my process for the nondestructive hydrogenation of gasoline boiling range olefin hydrocarbons, a hydrocarbon mixture consisting essentially of olefins formed by the polymerization of the olefin hydrocarbons in a hydrocarbon mixture containing propylene and butylenes, along with the impurities which have been formed in these olefins by storing it in contact with air and with water, was used as a charge stock. This mixture contained 90 per cent of olefin hydrocarbon and slightly less than 2 per cent of oxygen-containing compounds. This charge stock was, mixed with a limited amount of hydrogen, in this instance about 5 cubic feet of hydrogen per gallon of liquid olefin charge stock, both measured at atmospheric pressure and temperature. This mixture was compressed to about 750 pounds per square inch and heated to a temperature of about 400° F. and passed at about this temperature over a nickel-copper-alumina catalyst which had become deactivated for the non-destructive hydrogenation of purified olefin hydrocarbons. As this mixture passed over the catalyst in the catalyst chamber a reaction occurred consuming hydrogen and forming water from the oxygen-containing compounds. The effluent of the chamber contained 2.2 cubic feet of hydrogen per gallon of liquid hydrocarbon, and the olefin content of the liquid hydrocarbon had only been reduced to 80 per cent of the total hydrocarbons. For every gallon of liquid hydrocarbon charged there was produced about one-half ounce of water. The effluent from the chamber is cooled somewhat and passed over solid calcium chloride which removes the water from the stream. The hydrocarbon mixture thus purified is mixed with approximately three times as much paraffin hydrocarbons of substantially the same boiling point which is obtained from a subsequent step in the process. Hydrogen is then added so that the final mixture contains about one part by volume of liquid olefin, three parts by volume of liquid paraffin hydrocarbon and about 80 cubic feet of hydrogen measured at standard temperature and pressure for every gallon of olefin hydrocarbon present. This mixture is heated to a temperature of about 450° F. under a pressure of 750 pounds per square inch and passed over a relatively fresh nickel-copper-alumina catalyst in a second catalyst chamber. As the material passes through the catalyst chamber a reaction occurs between the hydrogen and the unsaturated hydrocarbons and heat is liberated so that by the time the materials reach the exit of the catalyst chamber they are at a temperature approximately 100° higher than the inlet temperature. The total olefin content of this effluent stream is about 0.6 per cent by volume of the hydrocarbons present. A portion of the effluent stream consisting of about three-fourths of the total volume of the hydrocarbons present is separated and recycled with additional olefins coming from the purification step. The other portion of the hydrocarbons is separated from the hydrogen which accompanied it and consists of over 99 per cent of paraffin hydrocarbons and the octane number of these hydrocarbons is somewhat above 90.

All the catalysts shown in the table of Example 1 contained 0.308 pound of nickel per gallon of catalyst, and the weight ratio of nickel to aluminum was held constant at a value of about 3.8:1, except for the catalyst where no alumina was present. Except for those catalysts so noted, at the start of the run the effluent hydrocarbon material from the hydrogenation chamber was completely saturated, but as the runs progressed a small amount of unsaturated hydrocarbons was present in the effluent, and it was necessary to increase the temperature to keep this amount negligibly low with a constant throughput.

Other runs indicated that an increase in the absolute amount of nickel present in the final catalyst increased the total amount of polymer which could be hydrogenated by a given volume of catalyst before it becomes deactivated. I have also found that only limited amounts of alumina need to be present, and that if the amount of alumina is increased so that the ratio by weight of nickel to aluminum is less than about 3:1 no substantial benefit results upon further increases in the alumina content. In general, I have found that, of the three metals present, there should be between 5 and 25 per cent by weight of aluminum, which of course is probably present as alumina, and between 10 and 50 per cent by weight of copper, which is probably present as metallic copper. The most active catalysts contain 10–20 per cent of aluminum (as alumina), and 15–30 per cent of copper, with the ratio of nickel to aluminum at a value of about 3.8:1.

Although pumice stone has been mentioned as a support, I wish it understood that I may use any desirable or available inert support, such as porous porcelain, silica gel, quartz, infusorial earth, asbestos, wood charcoal and the like. Such supports are not full equivalents of each other, but produce catalysts which are quite similar. However, although I may use activated alumina as a support, I have not found that the deposition of a mixture of nickel and copper oxides or hydroxides or the like upon activated alumina will produce a catalyst at all similar to or the equivalent of my nickel-copper-alumina catalyst herein described.

Furthermore, although I have found that it is important that the oxides of nickel, copper and aluminum should be intimately mixed together before reduction, they need not always be formed by decomposition of the nitrates. Thus, alternative but not completely equivalent methods of preparation include the coprecipitation of compounds of these metals upon supports from a solution of them which has been treated with an alkali, an alkaline carbonate or the like. Coprecipitates so formed may be dried and heat treated and subsequently treated with hydrogen, as described in connection with the nitrates. The temperature of treatment with hydrogen is often preferably quite low. Thus, I have produced a very active catalyst by placing a batch of the unreduced supported oxide in a hydrogenation catalyst chamber at about atmospheric temperature, gradually warming the material up to an initial hydrogenating temperature of about 300° F., while passing a stream of hydrogen over it, and immediately starting a hydrogenation run.

In my hydrogenation process, using a spent catalyst in a catalytic purifying step, I have found that a catalyst which has become inactive for the hydrogenation of olefin hydrocarbons at a temperature of about 650–700° F., will be quite active for promoting the reaction of hydrogen with oxygen-containing impurities at a temperature of about 350–450° F., that is, at about 200° F., or more below the final temperature of its previous use. The olefin hydrocarbons containing such impurities are readily treated without being diluted with paraffinic material, and I have found that I may successfully operate the process when the amount of hydrogen which accompanies such impure olefins is about 20–40 per cent of the total amount of hydrogen which would be required to saturate all the olefinic material present. However, an appreciable proportion of the hydrogen will pass through the purification step unreacted, and very little of the olefinic material will be reacted with hydrogen to form paraffin hydrocarbons. If it is desirable for other reasons, it should be possible to pass all the hydrogen which will be needed in the entire process along with the olefin through the purification step of my process. If the hydrogen charged to the process also contains impurities such as oxygen or the like, it may be desirable to pass all the hydrogen through this chamber so that it may also be purified. As long as low temperatures are used for the reaction of oxygen-containing impurities, little reaction of hydrogen with the unsaturated hydrocarbons will take place.

If, in the hydrogenation step, only that amount of hydrogen is used which is just in excess of that required to react with the unsaturated hydrocarbons present, it will be possible to produce a saturated product only after a very long reaction time. For this reason I prefer to use at least twice the amount of hydrogen needed, and preferably about five times as much hydrogen should be passed through the hydrogenation step. In this manner a low reaction time and a high throughput will result. Since unreacted hydrogen can be recycled in one manner or another, no overall loss need result.

I claim:

1. A catalyst comprising nickel, copper and alumina, and containing between 5 and 25 per cent by weight of the metals as aluminum and between 10 and 50 per cent by weight as copper.

2. A process for the nondestructive hydrogenation of unsaturated hydrocarbons, which comprises passing a hydrocarbon material containing unsaturated hydrocarbons along with free hydrogen over a nickel-copper-alumina catalyst under conditions of temperature and pressure adapted for nondestructive hydrogenation of said unsaturated hydrocarbons, said catalyst characterized by its relative composition and its method of preparation which comprises impregnating an inert granular supporting material with an aqueous solution of the nitrates of nickel, copper, and aluminum to incorporate therewith compounds of said metals, the amount of nickel corresponding to between 1.5 and 5 pounds of crystalline nickel nitrate per gallon of supporting material, with between 5 and 25 per cent by weight of said metals as aluminum and between 10 and 50 per cent by weight as copper, subjecting the treated support to an elevated temperature to decompose said compounds forming an intimate association of the oxides of said metals on said granular supporting material, and treating the resultant granular material with free hydrogen at a temperature sufficient to reduce at least a portion of said oxides and below 700° F.

3. A process as claimed in claim 2 in which the catalyst has a ratio of nickel to aluminum of about 3.8:1.

4. In the catalytic, non-destructive hydrogenation of olefin hydrocarbons in the gasoline boiling range which are associated with oxygen-containing impurities, the improvement which comprises passing such a hydrocarbon material in the presence of a limited amount of hydrogen under a superatmospheric pressure over a deactivated nickel-containing catalyst at a temperature sufficient to react said oxygen-containing impurities with hydrogen forming water, substantially completely dehydrating the effluent of said treatment, adding to said effluent paraffin hydrocarbons in an amount such that the ratio of paraffin to olefin hydrocarbons is between 1:1 and 10:1, also adding additional hydrogen to said effluent in an amount in excess of the amount of that required to react with the olefin hydrocarbons present, and passing the resultant mixture over a relatively fresh nickel-containing catalyst under reaction conditions of temperature and pressure for a time such that substantially all of said olefin hydrocarbons are non-destructively hydrogenated.

5. In a non-destructive hydrogenation of olefin hydrocarbons in the motor fuel boiling range wherein a hydrocarbon mixture containing said olefins is passed in the presence of hydrogen over a catalyst comprising nickel, copper and alumina and which is subject to poisoning by oxygen-containing impurities associated with said olefins, the improvement which comprises passing said olefins associated with said impurities over a deactivated nickel-copper-alumina catalyst in the presence of 20 to 40 per cent of the hydrogen which would be required to saturate said olefins and under a superatmospheric pressure and a temperature sufficient to react said oxygen-containing impurities with hydrogen forming water, removing water from the effluent of said treatment, adding to said effluent at least an equal volume of paraffin hydrocarbons of similar boiling range, adding hydrogen to said effluent in an amount such that the total hydrogen is appreciably in excess of that required to saturate completely the unsaturated hydrocarbons contained therein passing said resultant mixture at a reaction temperature and pressure over a solid catalyst comprising nickel, copper and alumina whereby unsaturated hydrocarbons become saturated with hydrogen, and recovering hydrocarbons from at least a portion of the effluent of said catalyst.

6. A catalyst comprising nickel, copper and alumina, and containing aluminum and nickel in the ratio of about 1:3.8 by weight and copper in an amount between 10 and 50 per cent by weight of the total amount of nickel, copper and aluminum.

7. A catalyst suitable for the non-destructive hydrogenation of olefin polymer in the motor fuel boiling range and comprising an intimate association of the hydrogen-reduced oxides of nickel, copper and aluminum upon an inert granular support, containing aluminum and nickel in a ratio of about 1:3.8 by weight, copper in an amount between 10 and 50 per cent by weight of the metals present, and containing between about 0.3 and 1.0 pounds of nickel per gallon of granular supporting material.

8. An improved process for the nondestructive hydrogenation of unsaturated hydrocarbons, which comprises subjecting a stream containing unsaturated hydrocarbons and an excess of free hydrogen, under conditions of pressure, temperature and contact time adapted to effect substantially complete nondestructive hydrogenation of said unsaturated hydrocarbons, to the action of a solid granular catalyst comprising an intimate association of reduced oxides of nickel, copper, and aluminum on a granular support, the amount of nickel being between about 0.3 and 1.0 pound per gallon of support, with between 5 and 25 per cent by weight of said metals as aluminum and between 10 and 50 per cent by weight of said metals as copper, maintaining the flow of said unsaturated hydrocarbons over said catalyst substantially constant over an extended period of time, and during said period of time progressively raising the temperature of the process as said catalyst becomes deactivated to a maximum temperature of about 650° F. to effect a substantially constant and complete nondestructive hydrogenation of said unsaturated hydrocarbons.

9. An improved process for the nondestructive hydrogenation of olefin hydrocarbons in the motor fuel boiling range, which comprises subjecting a stream containing such olefin hydrocarbons together with at least an equal volume of paraffin hydrocarbons of a similar boiling range and an excess of free hydrogen, under a hydrogenation pressure between 200 and 2000 pounds per square inch at a hydrogenation temperature and for a period of time adapted to effect substantially complete nondestructive hydrogenation of said olefins, to the action of a body of solid granular catalyst comprising an intimate association of reduced oxides of nickel, copper and aluminum on a granular support, the amount of nickel being between about 0.3 and 1.0 pound per gallon of support, with between 10 and 20 per cent by weight of said metals as aluminum and between 15 and 30 per cent by weight of said metals as copper, maintaining the flow of said olefin hydrocarbons over said body of catalyst substantially constant over an extended period of time, and during said period of time progressively increasing the said hydrogenation temperature as said catalyst becomes deactivated to a maximum temperature of about 650° F. to effect a substantially constant and complete nondestructive hydrogenation of said olefin hydrocarbons.

10. An improved process for the catalytic nondestructive hydrogenation of unsaturated hydrocarbons, which comprises passing a material comprising unsaturated hydrocarbons associated with nonhydrocarbon organic impurities and free hydrogen over a body of deactivated catalyst, comprising reduced intimately associated oxides of nickel, copper and aluminum on a granular supporting material, at a reaction temperature and pressure in the hydrogenating range to remove said nonhydrocarbon impurities from said material with reaction of only a minor part of said unsaturated hydrocarbons, admixing with the effluent of said deactivated catalyst saturated hydrocarbons in an amount sufficient to result in a mixture containing saturated and unsaturated hydrocarbons in a ratio between about 1:1 and 10:1, subjecting the resultant hydrocarbon mixture in the presence of a substantial excess of free hydrogen to a body of relatively fresh catalyst comprising reduced intimately associated oxides of nickel, copper and aluminum on a granular supporting material at a reaction temperature and pressure adapted to effect substantially complete nondestructive hydrogenation of said unsaturated hydrocarbons, each said catalyst containing between 0.3 and 1.0 pound of catalyst per gallon of supporting material with between 5 and 25 per cent by weight of said metals as aluminum and between 10 and 50 per cent by weight of said metals as copper.

11. An improved process for the nondestructive hydrogenation of olefin hydrocarbons in the motor fuel boiling range when said olefins are associated with nonhydrocarbon organic impurities, which comprises hydrogenating said olefins in the presence of a catalyst comprising a reduced intimately associated mixture of oxides of nickel, copper and aluminum on a granular support, the amount of nickel being between 0.3 and 1.0 pound per gallon of support, with between 5 and 25 per cent by weight of said metals as aluminum and between 10 and 50 per cent by weight as copper, initially passing said olefins and free hydrogen at an elevated temperature and pressure over a body of such a catalyst which has become deactivated by use as a hydrogenation catalyst to effect a removal of said organic impurities with reaction of only a minor part of said olefin hydrocarbons, admixing with the effluent of said initial treatment paraffin hydrocarbons of the same boiling range in an amount such that the ratio of paraffin to olefin hydrocarbons is between 1:1 and 10:1, passing the resultant mixture together with excess hydrogen under a superatmospheric pressure at a rate which is substantially constant over an extended period of time over a second body of such a catalyst which has not become deactivated by use and maintained at a nondestructive hydrogenation temperature, progressively during said period of time raising the temperature as said catalyst becomes deactivated to a maximum temperature of about 650° F. to effect a substantially constant and complete nondestructive hydrogenation of said olefins during said period of time, and recovering paraffins so produced from the effluent of the process.

12. In the nondestructive hydrognation of olefin hydrocarbons in the motor fuel boiling range wherein a hydrocarbon mixture containing said olefins is passed in the presence of hydrogen over a catalyst comprising the reduced oxides of nickel, copper and aluminum on a support and which is subject to poisoning by oxygen-containing impurities associated with said olefins, the improvement which comprises using as such a catalyst a granular material containing 0.3 to 1.0 pound of nickel per gallon of support, with between 10 and 20 per cent by weight of said metals as aluminum and between 15 and 30 per cent by wieght as copper, passing said olefins associated with said impurities over such a catalyst in a deactivated state in the presence of 20 to 40 per cent of the free hydrogen which would be required to saturate said olefins and under a superatmospheric pressure and at a temperature adapted to react said oxygen-containing impurities with hydrogen to form water, removing water from the effluent of said treatment, adding to the resultant material paraffin hydrocarbons of similar boiling range in an amount such that the ratio of paraffins and olefins is between 1:1 and 10:1, also adding free hydrogen in an amount such that the total free hydrogen present is substantially in excess of that required to saturate completely said olefins, passing the resultant mixture over such a catalyst in an active state at a hydrogenation pressure between 200 and 2000 pounds per square inch and a temperature greater than 200° F. and not greater than about 650° F., and recovering paraffin hydrocarbons so produced from at least a portion of the effluent of said active catalyst.

13. A catalyst suitable for the promotion of nondestructive hydrogenation of normally liquid olefin hydrocarbons in the motor fuel boiling range, comprising a hydrogen reduced intimate association of oxides of nickel, copper and aluminum as the sole catalytic ingredients on a solid granular supporting material, containing between 0.3 and 1.0 pound of nickel per gallon of said granular supporting material, with between 10 and 20 per cent of said metals as aluminum and between 15 and 30 per cent of said metals or copper, said intimate association of oxides having been produced by treating said supporting material with a concentrated solution of the nitrates of said metal, drying and decomposing nitrates associated with said supporting material, and repeating said treatment until said material contains the desired amount of said metals.

THOMAS G. STRICKLAND.